United States Patent Office 2,803,692
Patented Aug. 20, 1957

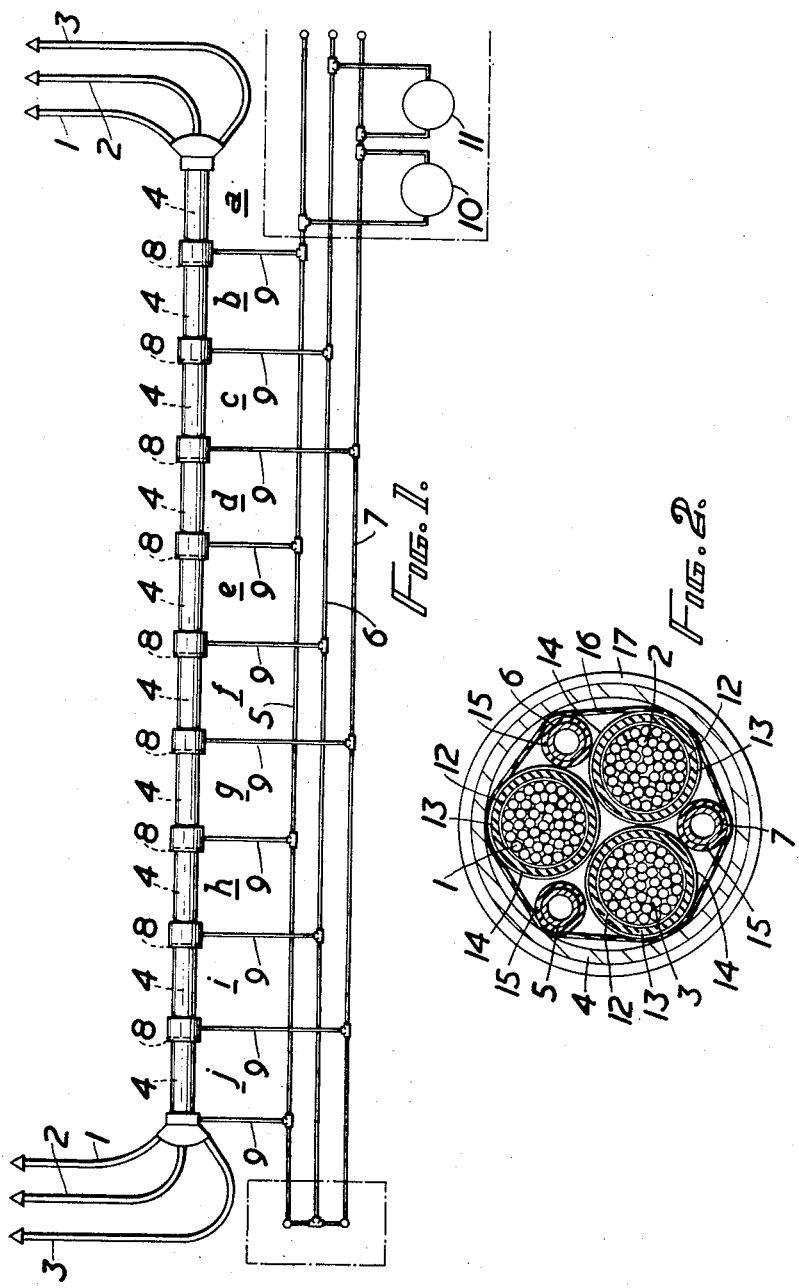

2,803,692

FLUID FILLED ELECTRIC CABLES

James Vincent William Richards, Blackheath, London, and Denis Frank Benford, Barnes, London, England, assignors to Johnson & Phillips Limited, London, England, a British company Application October 7, 1953, Serial No. 384,564

Claims priority, application Great Britain October 14, 1952

4 Claims. (Cl. 174—11)

This invention relates to fluid filled electric cables, that is, cables in which the cable core or cores are contained in a fluid filled sheath. The object of the invention is the provision of improvements in such fluid filled electric cables, which will enable the route length between the fluid charging points to be increased and which will enable the position of a leak in the sheath to be determined in a simpler manner than heretofore.

The invention consists broadly of an electric cable section, in which the cable core or cores are enclosed in a sheath which is filled with fluid under pressure, wherein said sheath is divided by means of fluid barriers into sub sections, and a plurality of transference tubes are provided extending along the section, said transference tubes being connected in succession respectively with successive sub sections along the section, and said transference tubes, during normal use, being connected together at the ends of the section.

In order that the invention may be the more clearly understood a fluid filled electric cable system in accordance therewith will now be described, reference being made to the accompanying drawings, wherein:

Figure 1 is a diagrammatic view illustrating one section length of a cable system in accordance with the invention;

Figure 2 is a cross section of the cable system;

Figure 3:
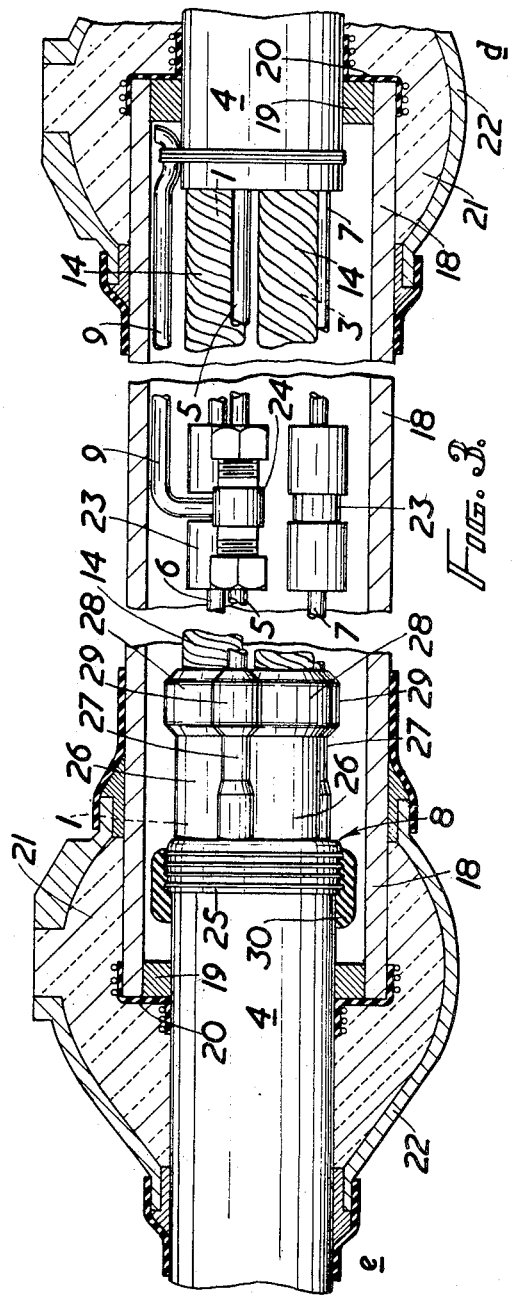
Figure 3 is a longitudinal section of the cable system, at the region of a connection between two sub sections within a section length.

The cable system is, in known manner, divided into sections by means of main fluid barriers or stop joints such that no fluid communication is possible between the sheaths of different sections, and each section has its sheath independently charged, and maintained charged, with a fluid such as oil or gas at a pressure above atmospheric pressure. As the sections are entirely independent it has only been deemed necessary to illustrate one section, and this is shown diagrammatically in Figure 1. Referring to this figure, the cable section comprises three insulated cores 1, 2 and 3 extending through a metal sheath 4 of say aluminum. The metal sheath also has extending through it three fluid transference tubes 5, 6 and 7. In the diagrammatic Figure 1, these transference tubes 5, 6 and 7 are shown, for the sake of clearness, outside the sheath 4, but actually they are inside the sheath as will appear hereinafter.

The section, is divided into a number of sub sections $a, b, c, d, \ldots$ each having a length of say one drum length of cable, and, at the points of junction of said sub sections subsidiary fluid barriers 8 are provided, which prevent direct fluid communiaction between the sheath portions of different sub sections, but through which the fluid transference tubes 5, 6 and 7 pass, as well as the cores 1, 2 and 3. The charging station is at the right hand end of the section according to Figure 1, and the three transference tubes 5, 6 and 7 are connected together at the left hand end, and said three transference tubes communicate by way of branch tubes 9, with the interior of the sheath 4 at points just to the right of the several sub barriers 8, such communication being in rotation so that one transference tube communicates with the first, fourth etc. sub sections; another communicates with the second, fifth etc. sub sections, and the other communicates with the third, sixth etc. sub sections. Thus, in the arrangement illustrated, in which there are three transference tubes 5, 6 and 7 and ten sub sections, $a, b, c, d, e, f, g, h, i, j$, the tube 5 communicates with the sub sections $a, d, g, j$, the tube 6 with the sub sections $b, e, h$ and the tube 7 with the sub sections $c, f, i$.

After the system has been charged with the fluid, the transference tubes 5, 6 and 7 are connected together at the charging (right hand) end as well as at the left hand end, and the common points at the two ends are connected to pressure gauges. These gauges are fitted with alarm contacts so that, in the event of a leak occurring in the system the resulting drop in pressure will cause a signal to be transmitted to an inspection point or the protective equipment.

In order to locate the leak, the sub section in which the leak exists is first determined. To do this the three transference tubes 5, 6 and 7 are each isolated, and it is thereby discovered by pressure gauge readings which is the transference tube which is connected to the leaky sub section. Suppose, for example, the sub section $g$ is the leaky sub section, the said pressure gauge readings will show that the transference tube 5 is the transference tube connected to the leaky sub section, or in other words that the leaky sub section is either $a, d, g,$ or $j$. The transference tubes 5, 6, 7 are then connected together again at the left hand end, while at the right hand or charging end the tube 5 (the leak-connected tube) is closed and so also is one other, say the tube 7, and fluid is fed at a constant pressure to the remaining tube 6. At this end also differential pressure gauges 10 and 11 are connected between the tube 7 and each of the other two tubes 5 and 6.

The readings of these differential pressure gauges are used to calculate the position of the communication point from the tube 5 to the leaky sub section. Thus, the differential gauge 11 between the tubes 6 and 7 will indicate the pressure drop from the right hand end to the left hand end of the tube 6 resulting from the fluid flow, and the differential gauge 10 between the tubes 7 and 5 will indicate the pressure drop from the left hand end of the tube 5 to the said communication point, resulting from the same fluid flow. From these two readings it is possible to calculate the position of the said communcation point from the following formula:

$$\Delta L = \frac{P_2 - P_1}{P_2} \cdot L$$

where $\Delta L$ is the distance between the feeding end and the said communication point from the tube 5 to the leaky sub section. L is the total length of the section. $P_1$ is the pressure difference indicated by the pressure gauge 10 between tubes 7 and 5. $P_2$ is the pressure difference indicated by the pressure gauge 11 between tubes 6 and 7.

Once the position of this communication point has been located, the leaky sub section has of course been determined, and it may be remarked that, as the next communication point on the same transference tube (5) is three subsections away, there is room for a fair amount of error in the calculated location of the required communication point without any possibility of error as to which is the leaky sub section.

Location of the actual position of the leak in the leaky sub section is then effected by known methods.

Referring now to Figure 2, which is a cross section of the cable at some point clear of the connections between sub sections, it will be seen that the cores 1, 2 and 3 are each surrounded by a conductor screen 12. This is surrounded by a dielectric layer 13, which in turn is surrounded by a Hochstadter screen 14. The fluid transference tubes 5, 6 and 7 are fitted in the spaces between the cores and are each covered by a paper lapping 15. The cores and tubes are bound by a common metal threaded binding tape 16. A layer of servings 17 is provided outside the sheath 4.

Referring to Figure 3, this shows a connection between sub sections. The sheath portions 4 of the two sub sections are joined together by means of a tubular connecting piece 18 whose ends surround the adjacent ends of said sheath portions, with annular spacing members 19 in between, rubber or rubber-like membranes 20 being secured, by binding, around said sheath portions 4 and the ends of said connecting piece 18, to effect seals. Finally, the seals are completed by means of sealing material 21 moulded in housings 22 mounted around the junctions between said sheath portions 4 and the ends of said connecting piece 18 as clearly shown.

The cable cores 1, 2 and 3 (2 not seen) project from the sheath portions 4 and are jointed together within the connecting piece 18 in any conventional manner. For the sake of clearness these cable cores and their junctions have been omitted from the centre portion of Figure 3.

Figure 4:
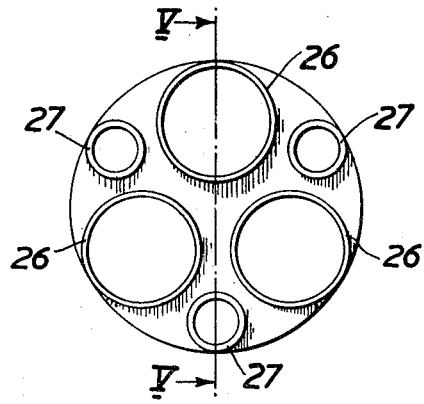
Figure 4 is an end elevation, to a larger scale of a fluid barrier included in Figure 3.
Figure 5:
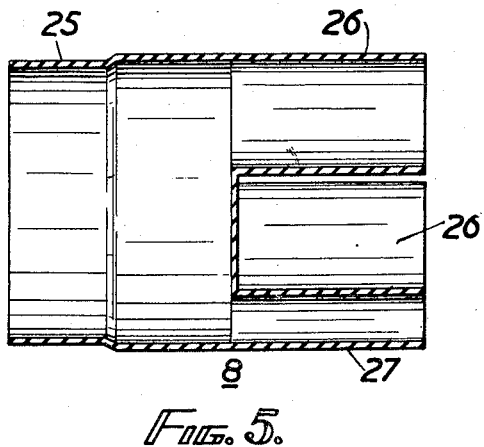
Figure 5 is a longitudinal section on line V—V of Figure 4.

The fluid transference tube portions 5, 6 and 7 of the two sub sections are connected by means of connections 23 and 24 as will be hereinafter more particularly described. The subsidiary fluid barrier 8 is constituted by a glove-like membrane of rubber or rubber-like material which is illustrated separately in Figures 4 and 5. Assuming that the two sub sections whose ends are shown in Figure 3 are the sub sections e and d, the transference tube 5 must be in communication with the sub section d, and the subsidiary fluid barrier 8 must isolate the sheath portions 4 of the two sub sections from each other.

The said membrane which forms said subsidiary fluid barrier has a tubular wrist portion 25 which is stretched around the end of the sheath portion 4 of the sub section e and secured by binding. Said membrane also has six finger portions projecting from said wrist portion 25, viz. three finger portions 26 which are of a size to fit closely around the paper lapped cores 1, 2 and 3, and three smaller finger portions 27 which are of a size to fit closely around the transference tubes 5, 6 and 7. In the case of Figure 3 the finger portions 26 fit around the projecting core portions 1, 2 and 3 of the sub section e and the finger portions 27 fit around the projecting transference-tube portions 5, 6 and 7 of said sub section e. Said finger portions are secured by binding around their respective cores and transference tubes, and to complete the seals, so-called poultices 28 and 29 are applied around the ends of the respective finger portions 26 and 27 as shown. A poultice 30 is also applied around the wrist portion 25 of the membrane.

The connections 23, which connect the transference tube portions 6 and 7, are conventional connections. The connection 24, however, which connects the transference tube portions 5, has the tube 9 extending from it and opening into the interior of the connecting piece 18. Thus the transference tube 5 is in communication with the interior of the sheath portion 4 of sub section d, but said sheath portion 4 of sub section d is completely cut off from that of sub section e. It will be seen that, for convenience, the tube 9 has its end secured by binding to the sheath portion 4 of sub section d.

It is recognised that in certain conventional systems in which the connecting piece 18 is filled with a fluid materially different from the main fluid of the cable and subsidiary barriers are fitted at each end of the sheath portions 4 of sub sections d and e it may be necessary to fit a turret to the connecting piece 18 and to bring the end of the piece 9 into this turret and provide fluid communication between this turret and the interior of the sheath portion 4 of sub section d.

It will be appreciated that said subsidiary fluid barrier 8 only has to withstand a pressure differential when charging the system or when leakage occurs in one of the sub sections, and such differential will never exceed about 50 lb. per square inch.

It will be understood that the permissible length of the main sections, i. e. the distance between the charging stations, is determined by the necessity to raise the fluid pressure within the section to the operating pressure within an economic time, and also by the necessity to provide safe operating conditions in the event of a leak in the sheath resulting in a pressure drop along the section. These limitations are well known, and it has been the practice to decrease the internal resistance to fluid flow, in the case of three cores within a pressure retaining sheath, by the provision of a single fluid transference pipe connected to the cable sheath at points therealong. A further refinement has been to interpose subsidiary fluid barriers in the sheath adjacent to these points of connection to the transference pipe, and thereby to divide the sheath into subsidiary sections, individually fed from said fluid transference tube. In this way the transference tube can be utilised to determine the position of a leaky sub section. In such a cable system maintained at a pressure of 200 lb. per square inch by means of dry nitrogen, and using a 0.285 inch bore fluid transference tube, the length of each main section is usually taken as not more than 12 miles. Also in such a cable system the location of the leaky sub section is difficult and time consuming.

By using, as in the present invention, a plurality of transference tubes instead of one, the resistance to fluid flow is greatly reduced and it becomes possible to increase the length of the main section over that normally accepted, without a corresponding increase in the charging time or increase in pressure drop along the installation under conditions of leakage and constant feeding pressure. Alternatively if the length of the section is not increased, the decrease in internal fluid resistance enables the charging to be performed in a reduced time and the permissible leak rate for a constant feed pressure to be increased. If three tubes are employed this length of main section may be increased to approximately three times that normally expected or alternatively if the length of main section is unaltered then the charging time may be reduced to approximately one third of that when one tube only is incorporated into the cable system.

Furthermore, by the adoption of a plurality of tubes together with the sub-division of the main section as described above, the invention allows the leaking sub section to be more quickly and more easily located than is possible with a system using only one fluid transference tube, as has been heretofore described.

In the case of a section as described above, if employing gas, and operating at a feed pressure at the charging end of 200 lb. per square inch, and if the three transference tubes are of 0.285 inch bore, it is possible, assuming that the minimum pressure permissible is 150 lb. per square inch, to make the section 36 miles long. With such an arrangement, the worst case is that of a large leak at a distance of approximately 24 miles from the charging end. With such leaks up to 20 litres per minute at normal temperature and pressure, corresponding to the maximum size of leaks that may be expected in actual practice, the lowest pressure along the section (viz. the pressure in the sub section where the leak occurs) is well above 150 lb. per square inch. On the other hand, with a single transference tube system, if the section is 12 miles long, and assuming that the feed pressure at the charging end is again 200 lb. per square inch and the transference tube is 0.285 inch bore, if a similar order of leak occurs at the end remote from the charging end, the pressure at the said remote end will fall to only just above 150 lb. per square inch.

Thus, with three transference tubes instead of one, it is possible to increase the length of the section (i. e. the distance between main barriers) by the factor three.

The formula given hereinbefore for determining the position of the communication point into the leaky sub section is unaffected by the condition of flow, but, in the case of a compressible fluid the fall in pressure along the transference tube under consideration results in a non-uniform fluid resistance per unit length of tube, and this does affect the reliability of the said formula.

In the case where the fluid is nitrogen and the feed pressure is 200 lb. per square inch, the formula may be reliably applied for all fluid flow rates up to 4 litres per minute at normal temperature and pressure over the 36 mile length of main section. It will be appreciated that during the location of a leak the fluid flows from the charging end, through one transference tube to the far end of the section and back by another transference tube to the leak sub section.

Leakages in excess of 4 litres per minute at normal temperature and pressure are easily located by other means known to those skilled in the art but if it is required that the accuracy for larger leakages be increased then means may be provided for sectionalising and isolating the fluid transference tubes at suitable intervals without resort to costly main barrier joints. However a considerable error is permissible in the use of the formula without error in the selection of the leaky sub section as the nearest entry from the communicating point is three sub sections away, this permissible error extending the size of leak that may be accurately located within the 36 mile length of main section to above 4 litres per minute at normal temperature and pressure.

An additional incidental constructional advantage of the invention is that, if the transference tubes 5, 6 and 7 are laid up as illustrated within the scores between the main cores 1, 2 and 3, said transference tubes support the fluid retaining sheath 4 without the use of impregnated wormings, and accordingly reduce the quantity of compound available to migrate and form blockages.

It is of course to be understood that the invention is applicable up to any number of sub sections. In the event of there being less than six sub sections, the invention will still apply down to two sub sections, but will involve less calculation in the location of the leak. Thus, with two sub sections there will be only two transference tubes and no calculation. With three sub sections there will be three transference tubes and no calculation. With four sub sections there will be three transference tubes, and calculation will be required only when the leak is in one of the two sub sections served by a single transference tube, and so on.

It is also to be understood that the invention is not limited to the employment of only three transference tubes, but there might be any number of transference tubes. If the number of tubes is $n$ each tube will be connected to every $n$th sub section. Also the transference tubes are not necessarily inside the sheath but could be outside the sheath.

Also the cable is not necessarily a three core cable but could have one or any number of cores.

The tubes may also be laid up in the spaces between three individually sheathed and reinforced single-core cables to provide a single cable or they may be laid totally external to single-core cables installed as such.

We claim:

1. An electric cable section, in which the cable core or cores are enclosed in a sheath which is filled with fluid under pressure, wherein said sheath is divided by means of fluid barriers into sub sections, and a plurality of transference tubes are provided extending along the section, the number of sub sections exceeding the number of transference tubes, said transference tubes being connected in successive rotation respectively with successive sub sections along the section, so that, if $n$ be the number of transference tubes, each transference tube is connected to every $n$th sub section, and said transference tubes, during normal use, being connected together at the ends of the section whereby all the sub sections of the section are connected by the transference tubes.

2. An electric cable section, in which the cable core or cores are enclosed in a sheath which is filled with fluid under pressure, wherein said sheath is divided by means of fluid barriers into sub sections, the sheath consisting of separate sheath lengths spaced from each other, a tubular connection surrounding the space between the adjacent sheath lengths and sealed to the ends of said sheath lengths, and the fluid barriers are within the tubular connections and each barrier comprises a glove-like membrane having a wrist portion sealed around the end of one spaced sheath length of adjacent sheath lengths and an open ended finger portion sealed around each cable core.

3. An electric cable section, in which the cable core or cores are enclosed in a sheath which is filled with fluid under pressure, wherein said sheath is divided by means of fluid barriers into sub sections, and a plurality of transference tubes are provided extending along the section, said transference tubes being connected in succession respectively with successive sub sections along the section, and said transference tubes, during normal use, being connected together at the ends of the section, whereby all the sub sections of the section are connected by the transference tubes, the sheath consisting of separate sheath lengths spaced from each other, a tubular connection surrounding the space between the adjacent sheath lengths and sealed to the ends of said sheath lengths, and the fluid barriers are within the tubular connections and each barrier comprises a glove-like membrane having a wrist portion sealed around the end of one spaced sheath length of adjacent sheath lengths and an open ended finger portion sealed separately around each cable core and transference tube.

4. An electric cable section, in which the cable core or cores are enclosed in a sheath which is filled with fluid under pressure, wherein said sheath is divided by means of fluid barriers into sub sections, and a plurality of transference tubes are provided extending along the section, said transference tubes being connected in succession respectively with successive sub sections along the section, and said transference tubes, during normal use, being connected together at the ends of the sections whereby all the sub sections of the section are connected by the transference tubes, the sheath consisting of separate sheath lengths spaced from each other, a tubular connection surrounding the space between the adjacent sheath lengths and sealed to the ends of said sheath lengths, and each transference tube consisting of separate lengths joined together within the tubular connections, and the juncture of one transference tube within each tubular connection communicating with the interior of the tubular connection.

References Cited in the file of this patent

UNITED STATES PATENTS

| | | |
|---|---|---|
| 1,933,312 | Clark | Oct. 31, 1933 |
| 1,981,536 | Zapf | Nov. 20, 1934 |
| 2,071,102 | Atkinson et al. | Feb. 16, 1937 |
| 2,401,595 | Wetherill | June 4, 1946 |